United States Patent
Knauft et al.

(10) Patent No.: US 6,654,754 B1
(45) Date of Patent: Nov. 25, 2003

(54) SYSTEM AND METHOD OF DYNAMICALLY GENERATING AN ELECTRONIC DOCUMENT BASED UPON DATA ANALYSIS

(75) Inventors: Christopher L. Knauft, San Diego, CA (US); Martin Franklin, San Diego, CA (US)

(73) Assignee: Inceptor, Inc., Maynard, MA (US)

( * ) Notice: Subject to any disclaimer, the term of this patent is extended or adjusted under 35 U.S.C. 154(b) by 0 days.

(21) Appl. No.: 09/456,784

(22) Filed: Dec. 8, 1999

Related U.S. Application Data

(60) Provisional application No. 60/111,501, filed on Dec. 8, 1998.

(51) Int. Cl.[7] .............................................. G06F 17/30
(52) U.S. Cl. ........................ 707/100; 707/101; 707/102; 707/103; 707/104
(58) Field of Search ................................. 707/100, 101, 707/102, 103, 104

(56) References Cited

U.S. PATENT DOCUMENTS

| | | | | |
|---|---|---|---|---|
| 4,817,036 A | * | 3/1989 | Millett et al. ................... | 707/7 |
| 5,276,616 A | * | 1/1994 | Kuga et al. .................. | 707/100 |
| 5,546,578 A | * | 8/1996 | Takada ............................ | 707/3 |
| 5,685,003 A | * | 11/1997 | Peltonen et al. ............... | 707/7 |
| 5,848,410 A | * | 12/1998 | Walls et al. .................... | 707/4 |
| 6,081,774 A | * | 6/2000 | De Hita et al. ................. | 704/9 |
| 6,094,649 A | * | 7/2000 | Bowen et al. ................. | 707/3 |
| 6,128,613 A | * | 10/2000 | Wong et al. .................... | 707/7 |
| 6,295,529 B1 | * | 9/2001 | Corston-Oliver et al. ...... | 707/3 |

FOREIGN PATENT DOCUMENTS

| EP | 0423683 A2 | * | 4/1991 | .......... G06F/15/40 |
|---|---|---|---|---|

* cited by examiner

*Primary Examiner*—Frantz Coby
(74) *Attorney, Agent, or Firm*—Choate, Hall & Stewart

(57) ABSTRACT

A system and method of generating index information for electronic documents. The system includes a client, one or more information retrieval (IR) engines, such as a search engine, which are each in communication with each other via a network. In one embodiment of the invention, the server maintains a plurality or data objects that are protected by digital rights management (DRM) software. Upon receiving a network request from one of the IR systems, the server dynamically generates an electronic document that provides index information that is associated with one of the data objects. In one embodiment of the invention, the server dynamically generates the contents of the electronic document based upon the indexing characteristics of the IR system. Furthermore, upon receiving a network request from one of the client, the server determines whether the client is authorized to access the data object that is associated with the network request. If the client is authorized to access the data object, the server transmits the data object to the user. Alternatively, if the client is not authorized to access the data object, the server dynamically prepares instructions to the client, the instructions describing additional steps the user at the client may perform to get authorized to access the data object.

14 Claims, 14 Drawing Sheets

FIG. 13

```
<html>
<head>
<title>MICROSOFT NAMES CREDIT CARD PROCESSING COMPANY</title>
</head>
<body bgcolor='white'>
<h1>MICROSOFT NAMES CREDIT CARD PROCESSING COMPANY<h1>
<p>Microsoft has hired the largest credit card authorization and processing company in the world to handle transactions placed over the Microsoft Network (MSN). NaBanco, a subsidiary of Atlanta-based First Financial Management Corporation will handle credit card purchases of goods and services from the growing list of service providers MSN is attracting, a list scheduled to expand by the dozens this week when Redmond releases the names of companies targeting the SOHO market through MSN.</p>
</body>
</html>
```

1300

*FIG.14* microsoft, hired, largest credit card authorization, processing company, world, handle transactions placed, microsoft network, msn, nabanco, subsidiary, atlanta-based first financial management corporation, handle credit card purchases, goods, services, growing list, service providers msn, attracting, list scheduled, expand, dozens, week, redmond releases, names, companies, targeting, soho market, msn

*FIG.15* microsoft, if, hired, but, largest credit card authorization, was, processing company, while, world, some, handle transactions placed, too, microsoft network, msn, in, nabanco, where, subsidiary, over, atlanta-based first financial management corporation, whereas, handle credit card purchases, do, goods, especially, services, must, growing list, thru, service providers msn, before, attracting, upon, list scheduled, that, expand, it, dozens, what, week, can, redmond releases, yes, names, should, companies, let, targeting, over, soho market, each, msn

FIG. 16 hired, microsoft, if, but, largest credit card authorization, was, while, processing company, world, some, msn, handle transactions placed, too, microsoft network, in, subsidiary, where, nabanco, over, atlanta-based first financial management corporation, do, handle credit card purchases, whereas, especially, goods, services, growing list, must, thru, service providers msn, attracting, before, upon, list scheduled, that, dozens, it, expand, what, week, redmond releases, can, yes, names, companies, should, let, soho market, over, targeting, each, msn

FIG. 17

```
<html>
<head>
    <title>MICROSOFT NAMES CREDIT CARD PROCESSING COMPANY</title>
    <meta name="description" content="Microsoft has hired the largest
    credit card authorization and processing company in the world">
</head>
<body bgcolor="white">
    <h1>MICROSOFT NAMES CREDIT CARD PROCESSING COMANY</h1>
    <p><a href="http:/www.mediadna.com/drm-content/000177455">Click here to
    access the article</a></p>
    <p><font color="white">hired, microsoft, if, but, largest credit card
    authorization, was, while, processing company, world, some, msn, handle
    transactions placed, too, microsoft network, in, subsidiary, where, nabanco,
    over, atlanta-based first financial management corporation, do, handle
    credit card purchases, whereas, especially, goods, services, growing list,
    must, thru, service providers msn, attracting, before, upon, list scheduled,
    that, dozens, it, expand, what, week, redmond releases, can, yes, names,
    companies, should, let, soho market, over, targeting, each, msn</font></p>
</body>
</html>
```

SYSTEM AND METHOD OF DYNAMICALLY GENERATING AN ELECTRONIC DOCUMENT BASED UPON DATA ANALYSIS

PRIORITY CLAIM

The benefit under 35 U.S.C. § 119(e) of the following U.S. provisional application is hereby claimed and incorporated by reference, in its entirety:

| Title | Application No. | Filing Date |
| --- | --- | --- |
| A Process For Obfuscating Document Source Such That The Obfuscated Version Adequately Represents The Originals For Use In Information Retrieval | 60/111,501 | December 8, 1998 |

DESCRIPTION OF RELATED APPLICATIONS

This application is related to U.S. application Ser. No.: 09/456,778, entitled "A SYSTEM AND METHOD OF OBFUSCATING DATA"; U.S. application Ser. No.:09/456,778, entitled "A SYSTEM AND METHOD OF DYNAMICALLY GENERATING INDEX INFORMATION FOR A DATA OBJECT BASED UPON CLIENT PROVIDED SEARCH WORDS"; U.S. application Ser. No.: 09/456,600, entitled "A SYSTEM AND METHOD OF DYNAMICALLY CUSTOMIZING THE CONTENT OF A NETWORK ACCESSIBLE ELECTRONIC RESOURCE BASED UPON THE IDENTITY OF THE REQUESTOR"; U.S. application Ser. No.: 09/456,793, entitled "A SYSTEM AND METHOD OF DYNAMICALLY GENERATING INDEX INFORMATION"; U.S. application Ser. No.: 09/45600, entitled "A SYSTEM AND METHOD OF PROVIDING MULTIPLE ITEMS OF INDEX INFORMATION FOR A SINGLE DATA OBJECT", which are being filed concurrently herewith on Dec. 8, 1999.

BACKGROUND OF THE INVENTION

1. Field of the Invention

The field of the invention relates to information retrieval systems. More particularly, the field of the inventions relates to generating index information for data objects.

2. Description of the Related Technology

Information retrieval (IR) systems index documents by searching for keywords that are contained within the documents. Typically, the searches are not performed on the documents themselves. Instead, words are extracted from the document and are then indexed in separate data structures optimized for searching.

However, secure documents, such as documents that are protected by digital rights management (DRM) software, present a special problem for IR systems. Traditionally, IR systems rely upon having full access to the contents of the document to prepare the index information for the document. For example, IR systems that index HyperText Markup Language (HTML) documents on the Internet typically open the HTML documents via its Uniform Resource Locator (URL), then download, parse, and index the entire document.

Secure software, however, does not permit this kind of unrestricted access. Access is restricted to those applications that are both authorized and trusted by the secure software. For security concerns, all other applications are prevented from accessing the protected document.

One way to solve this problem is to retrofit all pre-existing IR systems so that they are "rights enabled." This solution permits IR systems to communicate directly with secure software to obtain the document source. However, this approach makes a number of unrealistic assumptions, including: (i) that it is possible to retrofit legacy IR systems such that they would comply with the secure software's security requirements; (ii) that all secure system providers would be willing or able to make the necessary changes in a timely manner; and (iii) that it is possible to establish the necessary trust relationships between every secure provider, copyright holder, and IR system provider. This approach has attendant flaws and there is a need for a better solution.

Another problem with preparing index information for IR systems is that each IR system has different indexing algorithms for organizing and storing information. IR systems often analyze the header of the electronic document when selecting the index information for the electronic document. The header includes meta-information regarding the content of document. However, not all of the IR systems retrieve the same keywords from the electronic document when selecting the index information. For example, some IR systems remove duplicative words from the metatag information, while others do not. Furthermore, for example, some IR system recognize phrases, while others do not. Accordingly, it is difficult to customize index information that is ideally suited for use with more than one IR system.

Thus, there is a need for a system for providing index information to IR systems. The system should be able to provide information to the IR systems that is almost as usable as the original. Preferably, the system should not require the modification of any legacy IR systems. Furthermore, it should be difficult to reconstruct the original document source (or any reasonable facsimile thereof) from the provided index information. Furthermore, the system should be able to automatically customize the index information regarding an electronic document, on an IR system-by-IR system basis.

SUMMARY OF THE INVENTION

In one embodiment of the invention, a method of generating index information for a data object, the method comprising generating index information for the data object, wherein the index information includes a set of one or more keywords, selecting one or more of the keywords from the index information, identifying one or more words that are associated with the selected keywords, and adding the identified words to the set of keywords, the identified words providing additional keywords for the index information for the data object.

In yet another embodiment of the invention, a method of generating index information for a data object, the method comprising generating index information for the data object, identifying one or more words that are common to a group of data objects that includes the data object, and adding the identified words to the index information.

In yet another embodiment of the invention, a method of generating index information for a data object, the method comprising generating index information for the data object, wherein the index information includes a set of one or more keywords, identifying the roots of selected keywords, substituting the selected keywords with the roots.

In yet another embodiment of the invention, a method of generating index information for a data object, the method comprising generating index information for the data object, wherein the index information includes a set of one or more keywords, classifying one or more of the keywords into one or more classifications, selecting at least one of the classifications, and removing one or more of the keywords that are members of a selected classification of the keywords.

In yet another embodiment of the invention, a method of generating index information for a data object, the method comprising generating index information for a data object, wherein the index information comprises one or more keywords, selecting one or more of the keywords, identifying one or more keywords that are associated with the selected keywords with a semantic network, and adding the identified keywords to the index information.

BRIEF DESCRIPTION OF THE DRAWINGS

FIG. 13 is a block diagram illustrating the contents of an exemplary data object of FIG. 2.

FIG. 14 is a block diagram illustrating a set of index information that is based upon the exemplary data object shown in FIG. 13.

FIG. 15 is a block diagram illustrating the state of the index information of FIG. 14 subsequent to one or more reserved words being added to the index information.

FIG. 16 is a block diagram illustrating the state of the index information of FIG. 15 subsequent to the index information being randomized.

FIG. 17 is a block diagram illustrating an exemplary electronic document that is created by the server computer of FIG. 1 for transmission to the client computer of FIG. 1.

DETAILED DESCRIPTION OF EMBODIMENTS OF THE INVENTION

The following detailed description is directed to certain specific embodiments of the invention. However, the invention can be embodied in a multitude of different ways as defined and covered by the claims.

SYSTEM OVERVIEW

Figure 1:
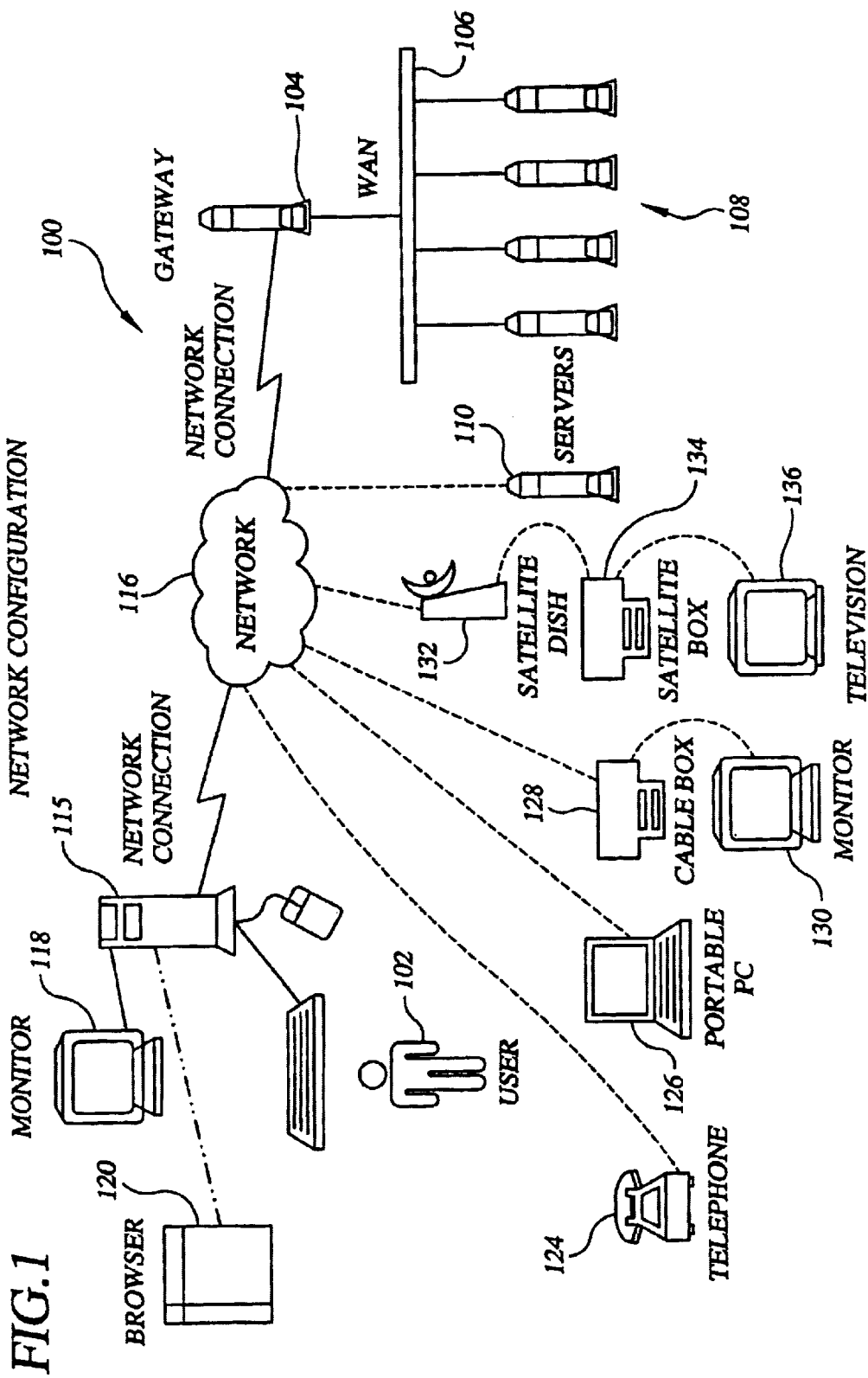
FIG. 1 is a block diagram illustrating one network configuration that comprises a client computer and a server computer that are connected via a network.

Referring to FIG. 1, an exemplary network configuration 100 will be described. A user 102 communicates with a computing environment which may include multiple server computers 108 or single server computer 110 in a client/server relationship on a computer network 116. In a client/server environment, each of the server computers 108, 110 includes a server program which communicates with a client computer 115.

The server computers 108, 110, and the client computer 115 may each have any conventional general purpose single- or multi-chip microprocessor such as a Pentium® processor, a Pentium® Pro processor, a 8051 processor, a MIPS® processor, a Power PC®, processor, or an ALPHA® processor. In addition, the microprocessor may be any conventional special purpose microprocessor such as a digital signal processor or a graphics processor. Furthermore, the server computers 108, 110 and the client computer 115 may be desktop, server, portable, hand-held, set-top, or any other desired type of configuration. Furthermore, the server computers 108, 110 and the client computer 115 each may be used in connection with various operating systems such as: UNIX, LINUX, Disk Operating System (DOS), VxWorks, PalmOS, OS/2, Windows 3.X, Windows 95, Windows 98, and Windows NT.

The server computers 108, 110, and the client computer 115 may each include a network terminal equipped with a video display, keyboard and pointing device. In one embodiment of network configuration 100, the client computer 115 includes a network browser 120 that is used to access the server computer 110. In one embodiment of the invention, the network browser 120 is the Internet Explorer, licensed by Microsoft Inc. of Redmond, Wash.

The user 102 at the computer 115 may utilize the browser 120 to remotely access the server program using a keyboard and/or pointing device and a visual display, such as a monitor 118. It is noted that although only one client computer 115 is shown in FIG. 1, the network configuration 100 can include hundreds of thousands of client computers and upwards.

The network 116 may include any type of electronically connected group of computers including, for instance, the following networks: a virtual private network, a public Internet, a private Internet, a secure Internet, a private network, a public network, a value-added network, an intranet, and the like. In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). The network 116 may connect to the client computer 115, for example, by use of a modem or by use of a network interface card that resides in the client computer 115.

The server computers 108 may be connected via a wide area network 106 to a network gateway 104, which provides access to the wide area network 106 via a high-speed, dedicated data circuit.

Devices, other than the hardware configurations described above, may be used to communicate with the server computers 108, 110. If the server computers 108, 110 are equipped with voice recognition or DTMF hardware, the user 102 can communicate with the server programs by use of a telephone 124. Other connection devices for communicating with the server computers 108, 110 include a portable personal computer 126 with a modem or wireless connection interface, a cable interface device 128 connected to a visual display 130, or a satellite dish 132 connected to a satellite receiver 134 and a television 136. For convenience of description, each of the above hardware configurations are included within the definition of the client computer 115. Other ways of allowing communication between the user 102 and the server computers 108, 110 are envisioned.

Further, it is noted the server computers 108, 110 and the client computer 115, may not necessarily be located in the same room, building or complex. In fact, the server computers 108, 110 and the client computer 115 could each be located in different states or countries.

Figure 2:
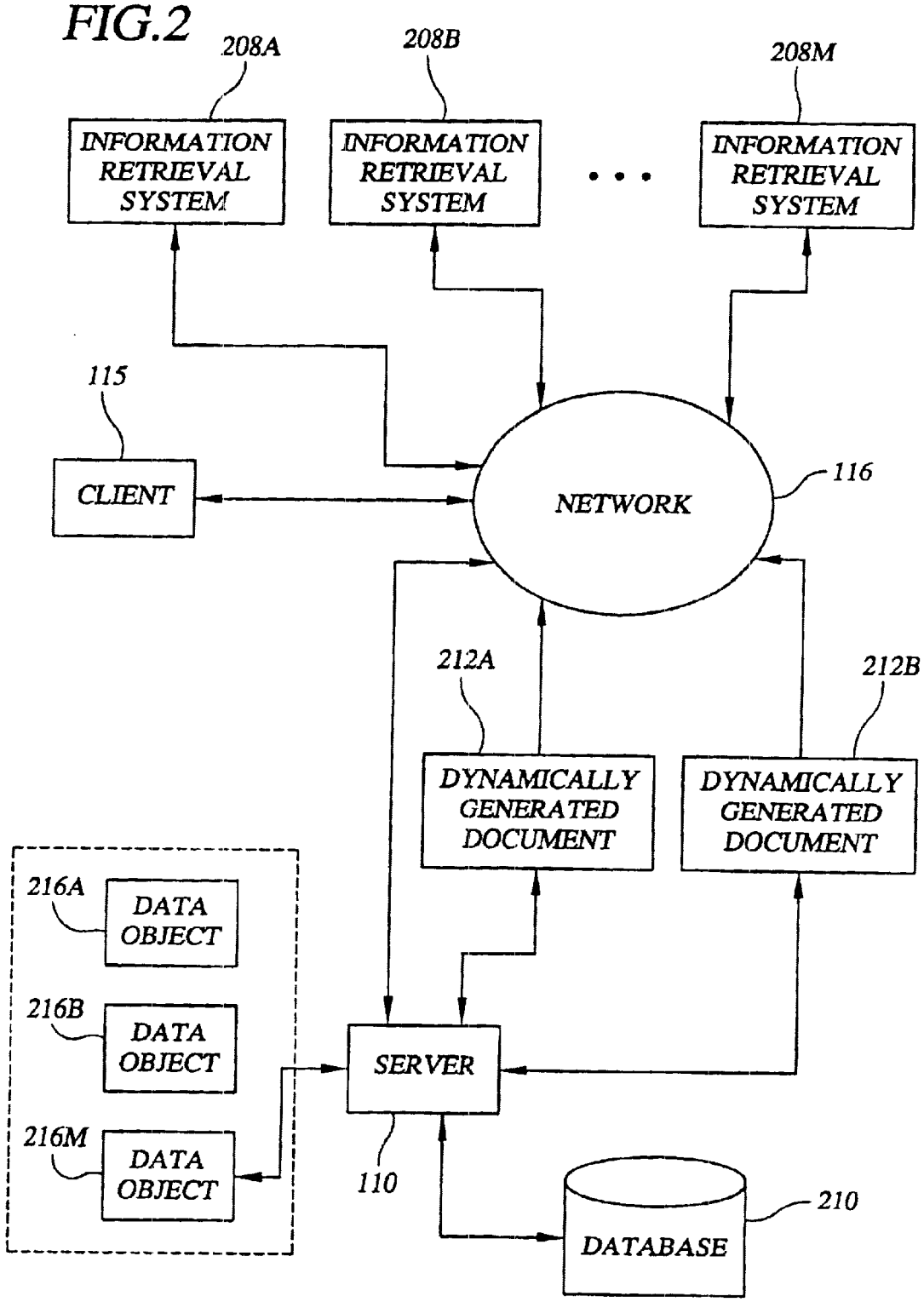
FIG. 2 is a data flow diagram illustrating in further detail the communication between the client computer and the server computer of FIG. 1.

FIG. 2 is a block diagram illustrating in further detail selected aspects of FIG. 1. FIG. 2 illustrates the communication between the communication between the client computer 115, a plurality of information retrieval ("IR") systems 208A–208M, and the server computers 108, 110. Each of the IR systems 208A–208M may be embodied in any of the hardware configurations set forth above with respect to the server computer 110 or the client computer 115. FIG. 2 illustrates that the client computer 115 is connected to the server 110 and the plurality of IR systems 208A–208M via the network 116. It is noted that although only three IR systems 208A–208M are shown in FIG. 2, the client computer 115 and the server computer 110 can be connected to a large number, e.g., hundreds or more, of IR systems. For convenience of description, the remainder of the discussion will refer only to the server computer 110 when referring to the server computers 108, 110. However, it is to be appreciated that the description of the operation of server computer 110, equally applies to the operation of the server computers 108. Optionally, the server computer 110 and the IR systems 208A–208M, or selected ones thereof, may be integrated on a single computer platform.

The IR systems 208A–208M can include one or more proprietary or commercial search engines, including only by way of example: AOL Search located at <http:\\search.aol.com\>, ALTAVISTA located at <http:\\www.altavista.com\>, ASKJEEVES located at <http:\\www.askjeeves.com\>, Direct Hit located at <http:\\www.directhit.com\>, Excite located at <http:\\www.excite.com\>, Hot Bot located at <http:\\www.hotbot.com\>, Inktomi located at <http:\\www.inktomi.com\>, MSN Search located at <http:\\search.msn.com\>, Netscape located at <http:\\search.netscape.com\>, Northern Light located at <http:\\www.northernlight.com\>, and Yahoo located at <http:\\www.yahoo.com\>The IR systems 208A–208M can also include a system licensed for private use and hosted within an intranet or an extranet. As an example, such an IR system can include Ultraseek licensed by InfoSeek of SunnyVale, Calif.

To publish information regarding a plurality of data objects 216A–216N, the server computer 110 associates each of the data objects 216A–216N with a selected URL, and then the server computer 110 notifies the IR systems 208A–208M of each of the selected URLs. For convenience of description, the data object that is associated with a selected URL is referred to below as the "source data object."

Selected ones of the IR systems 208A–208M use a software program called a "spider" (not shown) to survey the electronic resources that are stored by the computers connected to the network 116, such as the server computer 110. Electronic resources can comprise prepared electronic documents, or, alternatively, dynamically prepared electronic documents which are the output of scripts of the server computer 110. In one embodiment, the spiders are programmed to visit a server that has been identified by a server administrator as being new or updated. The spider follows all of the hypertext links in each of the electronic documents of the server until all the electronic documents have been read. An indexing program (not shown) reads the surveyed electronic documents and creates an index database based on the words contained in each of the surveyed electronic documents. In another embodiment of the invention, the server computer 110 provides a list of electronic documents in the server computer 110 that should be indexed by the IR system.

In one embodiment, the server computer 110 knows the indexing characteristics of the IR systems 208A–208M. In response to a request for a selected electronic resource, e.g., an electronic document, the server computer 110 dynamically generates an electronic document that comprises the index information for the source data object that is associated with the request. As defined herein, the term "dynamically generates" comprises either (i) preparing in real-time an electronic document or (ii) transmitting a pre-prepared electronic document that is associated with the URL and that is customized particularly for a selected requestor.

In customizing the index information, the server computer 110 attempts to maximize the odds that a user will find the index information for the source data object within the IR system. The index information for the source data object may optionally be obfuscated such that the index information may not be readily used for purposes other than indexing. Furthermore, in one embodiment of the invention, the server computer 110 maintains a database 210 that stores metadata for each of the data objects 216A–216N. By analyzing the metadata in the database 210, the server 210 can identify words that are not in the source data object, but if included in the index information for the source data object would be relevant, thereby increasing the odds that a user will find the source data object.

Once the electronic document has been indexed by the IR systems 208A–208M, the user 102 (FIG. 1) may supply search terms to one or more of the IR systems 208A–208M to receive a list of relevant documents. In one embodiment, one or more of the IR systems 208A–208M contain index information for documents that are maintained by servers other than the server computer 110.

When the user 102 enters a query using a selected one of the IR systems 208A–208M, the query is checked against the IR system's index database. The best matches are then returned to the user 102 as "hits", i.e., possibly relevant electronic documents based upon the search words in the query. The selected IR system displays for each of the hits at least some of the index information that is associated with each of the hits and an address, e.g., URL, of the hits. In one embodiment of the invention, the displayed addresses of the identified electronic document are selectable by using one or more input devices, such as a mouse. By selecting an address, the browser 120 automatically requests an electronic document from the selected address.

Upon receiving the request, the server computer 110 determines whether the requester is the client computer 115 or one of the IR systems 208A–208M. If the request is from one of the IR systems, as discussed above, the server computer 110 dynamically generates an electronic document that includes the index information for the source data object of the network request.

However if the server computer 110 determines that the requester is the client computer 115, the server computer 110 determines whether the client computer 115 is authorized to access the source data object. If the client computer 115 is authorized to access the source data object, the server computer 110 transmits the source data object to the client computer 115. However, if the client computer 115 is not authorized to access the source data object, the server computer 110 generates an electronic document that informs the user of which steps the user must perform to obtain access to the source data object.

The electronic request from the client computer 115 can correspond to one of any number of network protocols. In one embodiment of the invention, the electronic request comprises a Hypertext Transfer Protocol (HTTP) request. However, it is to be appreciated that other types of network communication protocols may be used.

HTTP allows the client 115, the server computer 110, and IR systems 208A–208M to communicate with each other. HTTP defines how messages are formatted and transmitted, and what actions the server computer 110, the client computer 115, and the IR systems 208A–208M should take in response to various commands. According to HTTP, the client computer 115 can request a network resource from the server computer 110. For example, when a URL is selected from in the browser 120 (FIG. 1), the browser 120 sends an GET command to the server that is hosting the URL, directing the server to fetch and transmit the electronic resources that are associated with the URL.

It is noted that all HTTP transactions follow the same general format. Each client request and server response has three parts: a request or response line, a header section, and the entity body. The client initiates a transaction as follows. First, the client computer sends a document request by specifying an HTTP command called a "method", e.g., GET, POST, followed by a resource address, and an HTTP version number. Next, the client sends optional header information to inform the server of its configuration and the document formats it will accept. The header information can include the name and version number as well as specifying resource preferences. For example, and exemplary GET transaction is as follows:

GET/index.html HTTP/1.0
Connection: Keep-Alive
User-Agent: Mozilla/2.02Gold (WinNT; I)
Host: www.MediaDNA.com
Accept: image/gif, image/x-xbitmap, image/jpeg, image/pjpeg, */*

It is noted that the "User-Agent" portion of the GET transaction describes the name or identifier of the requester. The body portion of a GET transaction is typically empty. According to the present invention, in response to a HTTP request for an electronic resource that is associated a selected UTRL, the server computer 110 transmits an electronic document having index or other descriptive information regarding the source data object that is associated with the request, or, alternatively, one of the source data object itself, depending on the identity and authorization of the requester.

In one embodiment of the invention, the electronic document includes a header and a body. The header and the body for the electronic document are dynamically created and customized in response to an electronic request for an electronic resource by the client computer 115 and/or one of the IR systems 208A–208M. The header describes properties of the document such as title, document toolbar, scripts and meta information. The body defines the page that is displayed to the user once the electronic document is received by the requester.

For example, assuming the electronic document is an HTML document, the header can include the following elements: BASE, LINK, META, and TITLE. The BASE element defines an absolute URL that resolves relative URLs within the document. The LINK element defines relationships between the document and other documents. The LINK element can be used to create tool bars, link to a style sheet, a script, or a printable version of the document and embed authorship details. The META element includes information about the document not defined by other elements. The META element supplies generic meta information using name/value pairs. The TITLE element is displayed in the window title. As is discussed in further detail below, the server computer 110, depending on the embodiment, customizes one or more elements of the header and body.

The data objects 216A–216N can be of any arbitrary format and can contain any type of data. For example, the data objects 216A–216N can include: an electronic document according to any open or proprietary format, e.g., HTML, PDF, PostScript, rich text format, structured database formats, SGML, TeX, TrueType, XHTML, XML, XSL, Cascading Style Sheets, LaTeX, MuTeX, ASCII, EBCDIC, AVI. Furthermore, for example, the content of the data objects 216A–216N can include: a music file, e.g., MP3: or MIDI, a multimedia file, a streaming media file, a bitmap image, configuration files, account information, an executable image, or a digital rights management (DRM) object.

Figure 3:
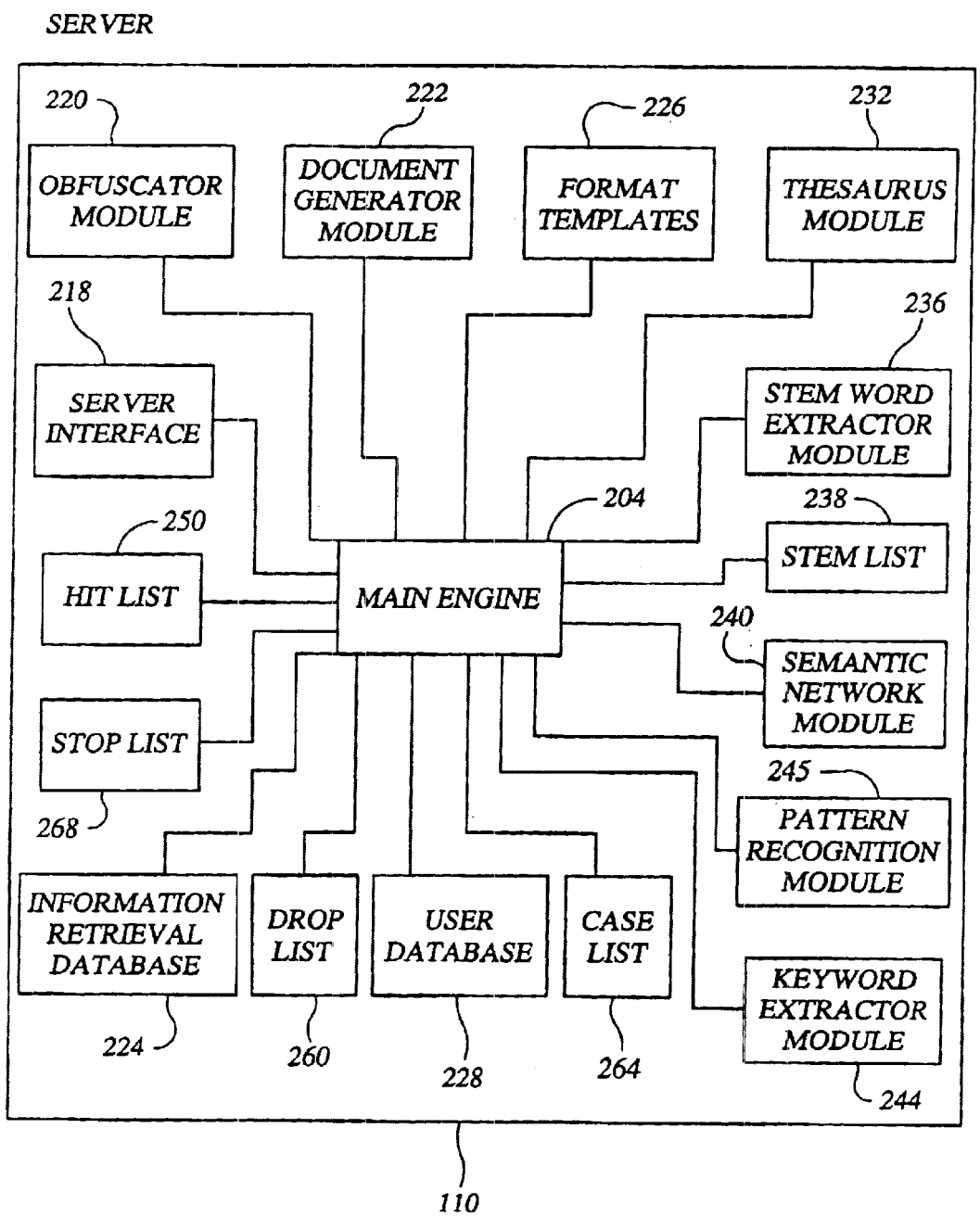
FIG. 3 is a block diagram illustrating in further detail the software components of the server computer of FIG. 2.

FIG. 3 is a block diagram illustrating one embodiment of the server computer 110 (FIG. 1). The server computer 110 includes a number of modules to prepare a response to request, from either the client computer 115 or one of the IR systems 208A–208M, for one of the electronic resources that is maintained by the server computer 110.

In one embodiment of the invention, the server computer 110 includes a main engine 204 which maintains control over the processes within the server computer 110. The main engine 204 is in communication with a number of modules including a server interface module 218, an obfuscator module 220, a document generator module 222, an IR system database 224, format templates module 226, a user database 228, a thesaurus module 232, a stem word extractor module 236, a semantic network module 240, a pattern recognition module 245 being able to generate machine readable tokens that represent patterns in audiovisual data objects, and a keyword extractor module 244.

As can be appreciated by one of ordinary skill in the art, each of the foregoing modules may comprise various subroutines, procedures, definitional statements, and macros. Each of the foregoing modules are typically separately compiled and linked into a single executable program. Therefore, the following description of each of the foregoing modules is used for convenience to describe the functionality of the server computer 110. Thus, the processes that are undergone by selected ones of the modules may be arbitrarily redistributed to one of the other modules, combined together in a single module, made available in a shareable dynamic link library, or partitioned in any other logical way.

The foregoing modules may be written in any programming language such as C, C++, BASIC, Pascal, Java, and FORTRAN and ran under the well-known operating system.

C, C++, BASIC, Pascal, Java, and FORTRAN are industry standard programming languages for which many commercial compilers can be used to create executable code.

The server interface module 218 is responsible for initially receiving a network request from the client computer 115 and/or the IR systems 208A–208M and forwarding the request to the main engine 204. The document generator module 222 is responsible for dynamically generating an electronic document that comprises the index information for a respective one of the data objects 216A–216N. The obfuscator module 220 obfuscates the contents of selected ones of the data objects 216A–216N in response to a request from the main engine 204. The format templates module 226 maintains a plurality of templates that define the layout of one or more of the data objects 216A–216N.

The IR system database 224 maintains the indexing characteristics of one or more IR systems. For example, the IR system database 224 includes information as to whether an IR system performs stemming, recognizes the case of keywords, recognizes duplicative words, and the number of words that are used by the IR system when indexing the electronic resource. In one embodiment of the invention, the indexing characteristics of the IR system is manually entered into the IR system database 224 via a system administrator at the server computer 110 in response to prompts by the server computer 110. In another embodiment of the invention, each of the IR systems automatically provide their indexing characteristic information based upon a request for such information. In yet another embodiment of the invention, each of the IR systems provide their indexing characteristic as part of the request for an electronic resource that is maintained by the server computer 110.

The user database 228 stores information regarding each of the users that have requested access to one of the data objects 216A–216N and/or have a license to access the data objects 216A–216N. One embodiment of the user database 228 is described in further detail below with respect to FIG. 4.

The thesaurus module 232 defines for selected index words, a set of other related index words. Furthermore, the semantic network module 240 analyzes each of the data objects 216A–216N for their semantic meaning. The server computer 110 may optionally insert one or more index words that are provided by the thesaurus module 232 and/or the semantic network module 240 into the index information of the source data object.

The keyword extractor module 244 prepares an initial set of index words based upon the contents a selected one of the data objects 216A–216N. The keyword extractor module 244 determines whether any index information has already been prepared for the selected data object, or, alternatively, dynamically generates the index information for the selected data object. For example, if the selected data object is a music file, the keyword extractor module 244 can determine whether any index information is currently associated with the music file and/or scan the music to identify any words that are within the music. Furthermore, for example, if the selected data object is a bitmap image, the pattern recognition module 245 (FIG. 3) can use optical character recognition (OCR) software so as to identify any words that are used within the bitmap image and use those identified words as the index information for the bitmap image.

The main engine 204 also is connected to a stem list 238, a hit list 250, a drop list 260, a case list 264, and a stop list 268. The stem list 238 describes for one or more index words, a corresponding stem of the word. The server computer 110 may optionally reduce the overall size of the index information by substituting a stem of an index word for the index word. In one embodiment of the invention, the server computer 110 removes selected prefixes and/or suffixes from the index words to create the stemmed words. For additional reference, information regarding stemming can be found in M. F. Porter, An Algorithm for Suffix Stripping, in Reading in Information Retrieval (Morgan Kaufinann, 1997).

The hit list 250 contains a list of words that are commonly used by users when searching the IR systems. In one embodiment of the invention, the hit list 250 is generated over time. In this embodiment, in each request for an electronic document, the client computer 115 provides to the server computer 110 a list of the keywords that were used by the user 102 when the user 102 searched for the source data object via one of the IR systems 208A–208M. For example, assuming the request is a HTML request which was prepared in response to a user selecting a "hit" that was displayed by one of the IR systems, the browser 120 automatically includes in the request the search terms that were used by the user 102 in generating the hit. The server computer 110 accumulates and analyzes the keywords thereby identifying popular keywords which are used by users when searching for the data objects 216A–216N.

Furthermore, in yet another embodiment of the invention, group hit lists (not shown) are maintained for groups of the data objects 112, each of the group hit lists describing popular words that were used by users to locate documents within the respective group.

The drop list 260 includes a list of search words that are infrequently or never used by users when users search for the data objects 216A–216N via the IR systems 208A–208M. The server computer 110 may optionally remove one or more of the words from the index information for a selected data object if the words are found in the drop list 260.

The case list 264 includes a list of search words that have more than one associated spelling using different cases, e.g., IBM, ibm. If the requesting IR system is case sensitive, the server computer 110 can optionally add one or more words from the case list to the index information for the source data object.

The stop list 268 includes a list of stop words which are removed from the index information for the source data object. The stop words are those words that should not be included in the index information because: (i) the words have special meaning to the IR system since they are part of a search grammar, (ii) the words occur so often that the words are considered to be of little relevance, and/or (iii) the provider of the data objects 216A–216N has decided to remove the words from the index information for personal or business reasons, such as privacy. FIG. 18 illustrates the contents of an exemplary stop list 268.

Figure 4:
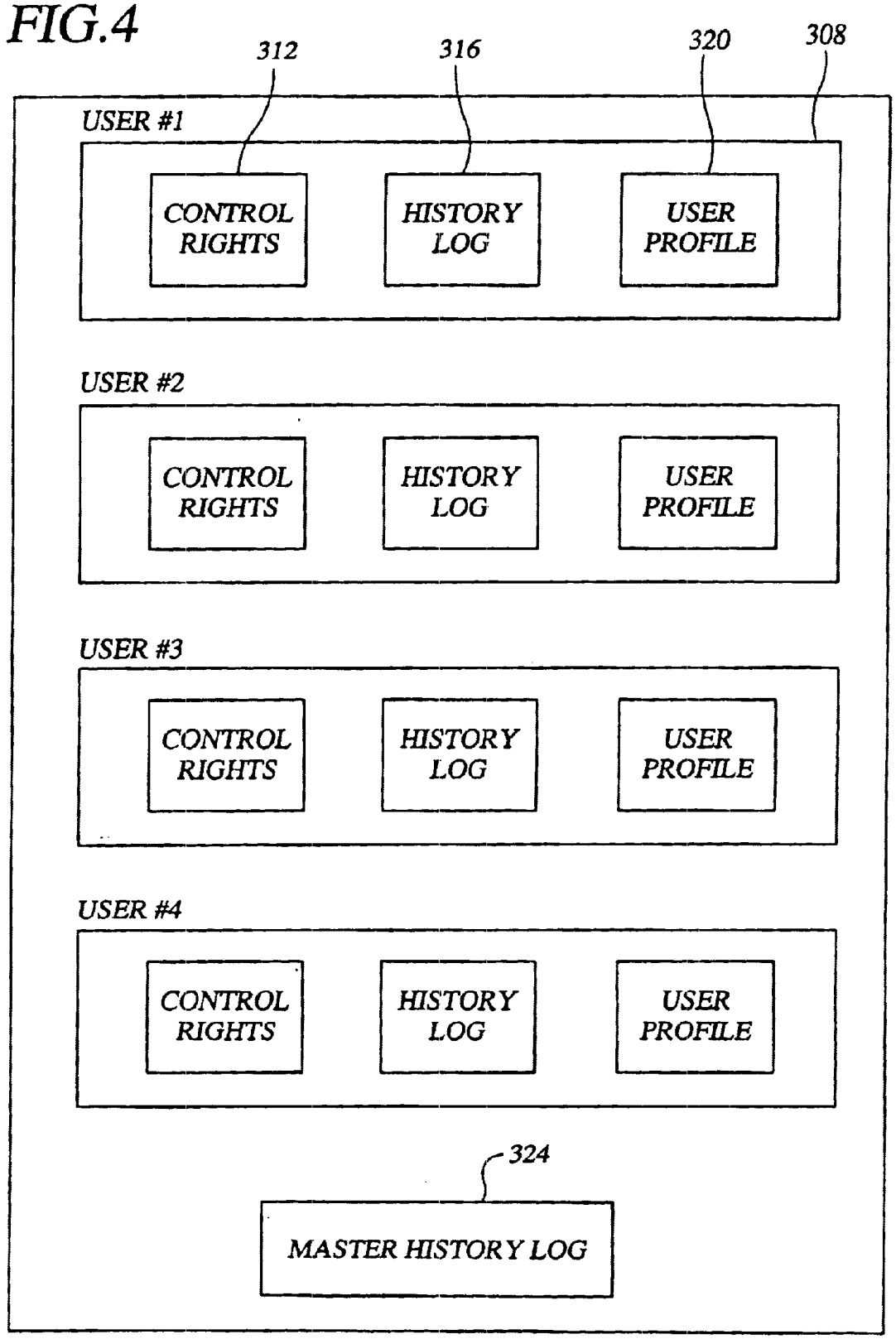
FIG. 4 is a block diagram illustrating the components of a user database that is maintained by the server computer of FIG. 1.

FIG. 4 is a high-level block diagram illustrating in further detail some of the data items that are stored in the user database 228. In one embodiment of the invention, a record 308 is maintained for each of the users. The record 308 includes control rights 312, a history log 316, and a user profile 320. The control rights 312 specify the rights of the user with respect to one or more of the data objects 216A–216N. In one embodiment if the invention, the control rights 312 specify the rights of the user with respect to a group of the data objects 216A–216N.

The control rights 312 can include various items, such as: the right to print, copy, view, edit, execute, delete, and merge with another data object. Further, the control rights 312 can also specify a number of uses with respect to each of the control rights. For example, the control rights can specify that the user is allowed to print a selected one of the data objects such as data object 216B five times. In another embodiment of the invention, the control rights 312 may be applied to a group or all of the users. In another embodiment of the invention, the control rights may be integrated with one or more of the data objects 216A–216N.

The history log 316 maintains a transaction history of each of the data objects 216A–216N that have been requested by the user, as well as those search terms which were used by the user to identify the data objects 216A–216N. In one embodiment of the invention, the history logs of each of the users are consolidated into a master history log 324.

The user profile 320 includes information regarding the personal preferences of the user. For example, the user profile 320 can include one or more templates that are preferred by the user when viewing the data objects. Additionally, the user profile 320 can include a national language that is preferred by the user, e.g., English, German, French, Swedish.

OPERATION FLOW

Figure 5:
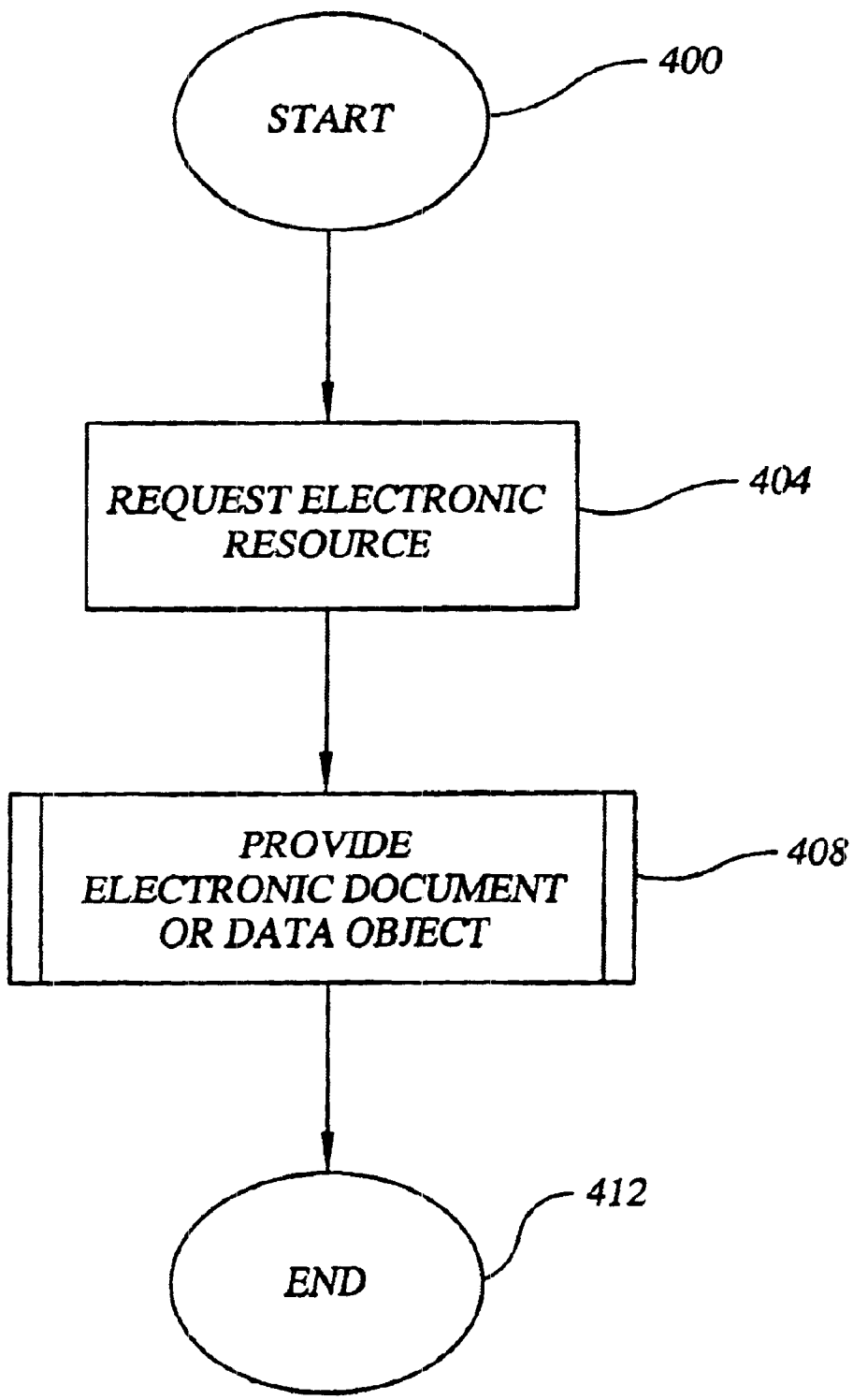
FIG. 5 is a top level flowchart illustrating a process for preparing a response to a request for an electronic resource that is maintained by the server computer of FIG. 1.

FIG. 5 is a high-level flowchart illustrating a process for generating an electronic document. After starting at a state 400, the process flow moves to a state 404, wherein a requester requests an electronic document that is associated with a specified URL. In one embodiment of the invention, the network request for the electronic document is an HTTP request for an document that is associated with a selected URL.

After receiving the network request from either the user client computer 115 or one of the IR systems 208A–208M, the process proceeds to a state 408 wherein the server computer 110 dynamically generates an electronic document that provides index or other descriptive information regarding the source data object that is associated with the request, or, alternatively, retrieves the data object that is associated with the specified URL.

The process for providing an electronic document or data object is described in further detail below with respect to FIG. 6. However, in brief, the process is as follows. If the server computer 110 determines that the requester is authorized to access the data object that is associated with the specified URL, the server computer 110 transmits the source data object that is associated with he request. However, if the requester is not authorized to access the data object, the server computer 110 generates a customized electronic document based upon whether the requester is one of the IR systems 208A–208M (FIG. 2) or other type of user, such as the client computer 115 (FIG. 2). If the requester is one of the IR systems 208A–208M, the server computer 110 generates an electronic document that includes the index information for the source data object.

If the requester is the client 115, the server computer 110 generates an electronic document that describes for the user the steps that the user must perform to obtain access to the source data object. After completing state 408, the process flow moves to an end state 412 wherein the server computer 110 waits for further document requests from the network 116.

Figure 6:
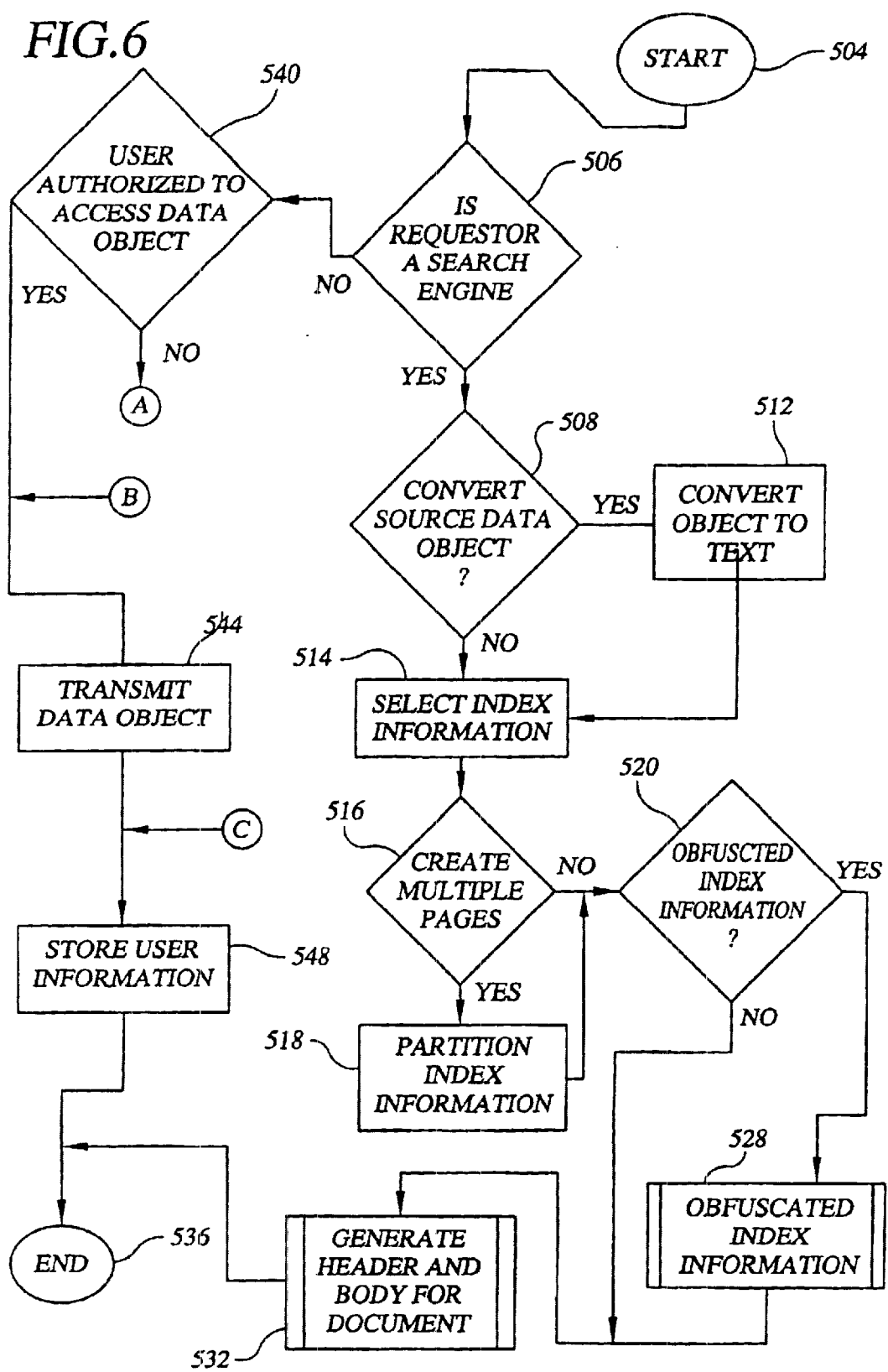
FIGS. 6 and 7 are collectively a flowchart illustrating in further detail the states of FIG. 5 whereby the server computer prepares a response to the request for the electronic resource.

FIG. 6 is a flowchart illustrating in further detail one embodiment of a process for providing a response to a request for an electronic resource that is maintained by the server computer 110. FIG. 6 illustrates in further detail the acts that occur within state 408 of FIG. 5. It is noted that, depending on the embodiment, selected steps of FIG. 6 may be omitted and that other steps may be added.

After starting at a start state 504, the process flow proceeds to a decision state 506. At the decision state 506, the server computer 110 determines whether the requester of the data object is one of the IR systems 208A–208M or, alternatively, the client computer 115. To determine the identity of the requester, the server computer 110 analyzes the electronic request (received in state 404 of FIG. 5) for a requester identifier. The request identifier can be a unique value or a digital signature that is associated with the requester.

If the server computer 110 determines that the requester is an IR system, the server computer 110 proceeds to a state 508 wherein the server computer 110 (FIG. 2) determines whether all or selected portions of the source data object that is associated with the request should be converted into index information. If the server computer 110 determines that selected portions of the data object should be converted into machine readable text, the server computer 110 proceeds to a state 512.

At the state 512, the server computer 110 converts all or selected portions of the source data object that is associated with the request into machine readable characters, that will collectively comprise an initial set of index information for source data object. For example, if the source data object comprises a music file, the server computer 110 may parse the music file to identify any words that are included within the lyrics of the music. As another example, if the source data object is a bitmap image, the server computer 110 may employ character recognition to identify one or more textual elements within the bitmap image using optical character recognition software. Furthermore, if the source data object is a multimedia and/or a streaming media file, the server computer 110 may read and store any close captioned information that is associated with the file, or alternatively, employ one or more the above-described conversion techniques. Furthermore, if the source data object comprises text of another language, the server computer 110 can convert all or selected portions of the source data object into another language, such as English.

In one embodiment of the invention, the server computer 110 maintains a list which describes one or more conversion processes to be employed with respect to the source data object. In another embodiment of the invention, the conversion information is predefined and stored within the source data object or at another known location.

If at the decision state 508 the server 110 determines not to convert the source data object, or, alternatively, after completing the state 512, the process proceeds to a state 514. At the state 514, the server computer 110 selects the index information for the source document. The index information can include the selected textual portions of the source data object, such as was converted at state 512, or alternatively, portions of the source data object that is already in textual form. In one embodiment of the invention, the server computer 110 comprises predefined index information that is associated with the source data object. The predefined index information can be stored in one of several locations, including: a file on the server computer 110, a predefined section of the source data object, a predefined location on a remote computer, or a location on the network that is identified by the source data object.

Continuing to a decision state 516, the server computer 110 (FIG. 1) determines whether to create multiple electronic documents based upon the index information for the source data object. The provider of the data object may desire to export multiple electronic documents of index information, each of the electronic documents being directed to a selected portion of the data object. If the server computer 110 determines that multiple documents are to be created, the server computer 110 proceeds to a state 512.

Figure 8:
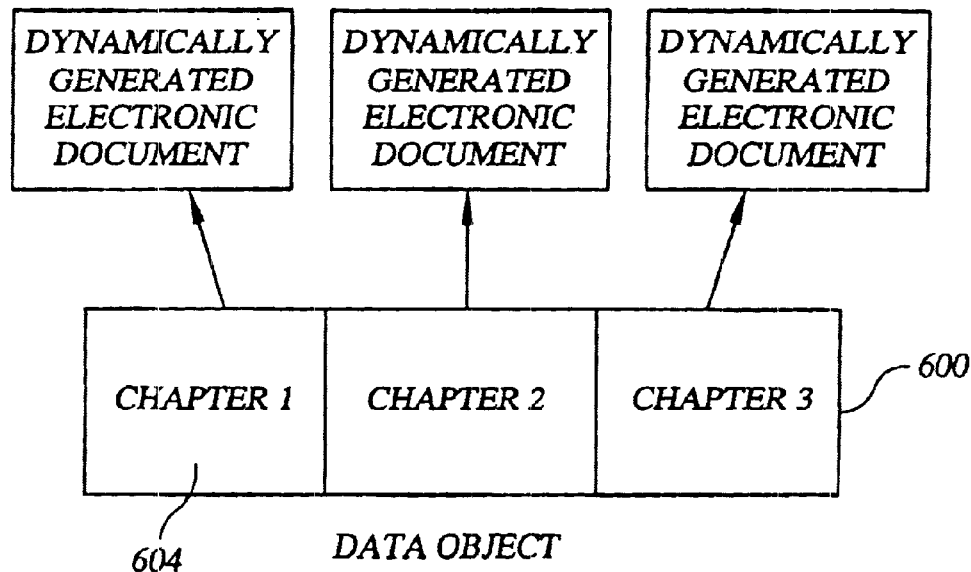
FIG. 8 is a block diagram illustrating one of the data objects shown in FIG. 2 being partitioned into multiple sections, each of the sections comprising a chapter in a book.

At the state 518, the server computer 110 (FIG. 1) partitions the index information into two or more sections. In one embodiment of the invention, the source data object includes its partition information. In another embodiment of the invention, the server computer 110 dynamically analyzes the source data object so as to identify one or more partitions. For example, if the source data object comprises a number of songs, the server computer 110 can partition the source data object based upon each of the songs. Furthermore, for example, with reference to FIG. 8, if the source data object comprises an electronic book 600, the server computer 110 can partition the source data object into one or more sections 604, each of the sections being based upon one of the chapters of the book. To facilitate traversal the web documents by a spider, the server computer 110 may optionally include in the body of each of the electronic documents a link to one or more of the other partitions.

If at the decision state 516, the server computer 110 determines not to create multiple documents of index information, or, alternatively, after completing state 518, process flow proceeds to a decision state 520. At the state 520, the server computer 110 determines whether to obfuscate the index information. In one embodiment of the invention, each of the data objects 216A–216N (FIG. 1) may designate whether the index information should be obfuscated. In another embodiment of the invention, a flag indicating whether the data object should be obfuscated is stored in a predefined location, such as on the server or another computer that is connected to the server via the network 116 (FIG. 2).

If the server computer 110 (FIG. 2) decides to obfuscate the index information, the server computer 110 proceeds to a state 528. At the state 528, the server computer 110 obfuscates the index information. The obfuscation process is described in further detail below with reference to FIG. 10. However, in brief, the obfuscation process modifies the index information such that if the index information was viewed by a user, the user would not be able to easily reconstruct the original content of the source data object.

Referring again to the decision state 520, if the index information is already obfuscated or if obfuscation is not desired, or, after completion of the state 528, the server computer 110 proceeds to a state 532. At the state 532, the server computer 110 dynamically generates a header and body for an electronic document using the prepared index information. The process for dynamically generating the electronic document is described in further detail below with reference to FIG. 11.

The server computer 110 then proceeds to an end state 536 waiting for additional electronic resource requests. Once the request is received, the process flow starts again at the state 400 (FIG. 5).

Referring again to the decision state 506, if the server computer 110 (FIG. 1) determines that the requester is the user 102 (FIG. 1), the server computer 110 proceeds to a decision state 540. At the decision state 540, the server computer 110 determines whether the user 102 is authorized to access the source data object that is associated with the requested electronic resource. In one embodiment of the invention, the server computer 110 identifies the identity of the user by examining the user information that was provided by the client computer 115 as part of the request for the electronic resources. For example, in a HTTP request, user authentication can be performed using HTTP Authentication, e.g. RFC 2617 as is described at <http://www.ietf org/rfc/rfc2617.txt>. The server computer 110 may also optionally display an authorization screen wherein the user 102 is requested to provide identifying information, password, or digital signature. Upon identifying the identity of the user 102, the server computer 110 examines the control rights 312 (FIG. 3) that are associated with the user to determine the access rights of the user 102. In another embodiment of the invention, the server computer 110 displays a description of the source data object and a hyperlink to an authentication server (not shown). If the user selects the hyperlink, the authentication server determines whether the user is allowed access to the source data object.

If the server computer 110 (FIG. 1) determines that the user 102 is authorized to access the data object, the server computer 10 proceeds to a state 544. At the state 544, the server 110 checks the format templates module 266 to see if the source data object has an associated format template. If the source data object has an associated format template, the server computer 110 formats the source data object according to the specifications of the associated format template. The server 110 then transmits the source data object to the client computer 115. If the source data object is a streaming media file, the server computer 110 streams the content of the data object to the client computer 115 (FIG. 1).

Continuing to a state 548, the server computer 110 stores one or more items of user information. For example, the user information can include: the name of the user 102, an identifier that is associated with the user, the time the data object was transmitted to the user, and one or more search words that were used by the user 102 to locate the electronic resource. Next, the server computer 110 moves to the end state 536 and waits for additional electronic resource requests.

Referring again to the decision state 540, the if the server computer 110 (FIG. 1) determines that the user 102 (FIG. 1) is not authorized to access the source data object, the server computer 110 proceeds to a state 700 (FIG. 7) via off page connector "A." At the state 700, the server computer 110 generates an electronic document that will describe to the user 102 what steps the user 102 should take to become authorized to access the source data object. At the state 700, the server computer 110 generates a header and body for the electronic document.

Figure 9:
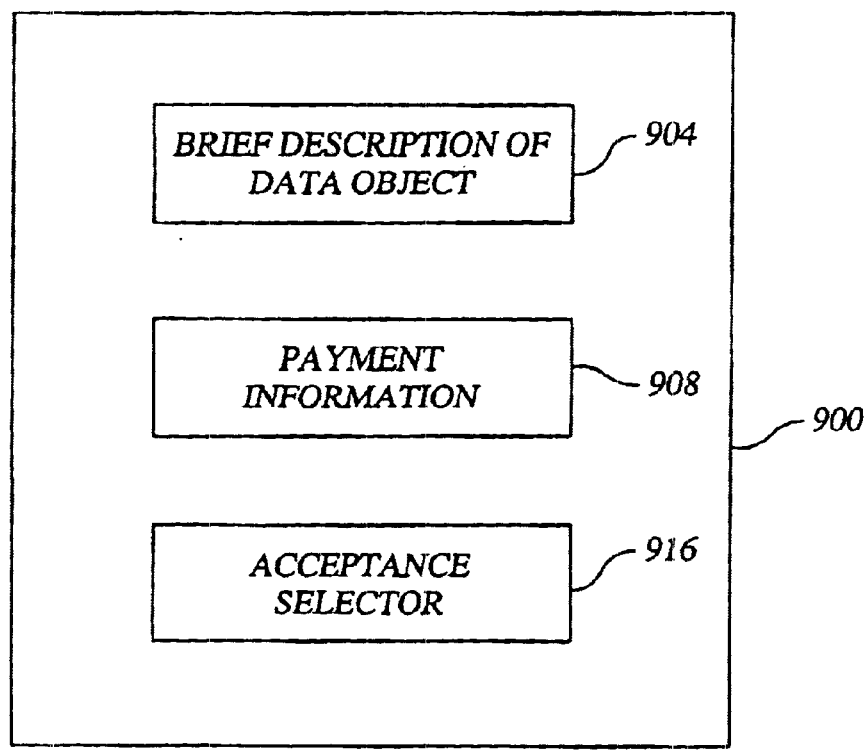
FIG. 9 is a representational block diagram illustrating an exemplary screen display that is transmitted to the client computer (FIG. 1) from the server computer (FIG. 1) in response to a request for an electronic resource from the client computer.

With respect to FIG. 9, an illustrative electronic document 900 is shown that includes a brief description 904 of the source data object, payment information 908 for the source data object, and an acceptance selector 916. The acceptance selection is an icon, such as a button, whereby selecting the user can indicate approval and acceptance of the conditions of the payment information 908.

Continuing to a decision state 704, the server computer 110 determines whether the user 102 agrees to the conditions of access that were specified in the electronic document (prepared in state 700). If the user 102 (FIG. 1) agrees to the access conditions, the server computer 110 proceeds to the state 544 (FIG. 6) via off page connector "B." State 544 is described in further detail above. However, if the user 102 does not agree to the access condition, the server computer 110 proceeds to the state 548 (FIG. 6) via off page connector "C." State 548 is described in further detail above.

Figure 7:
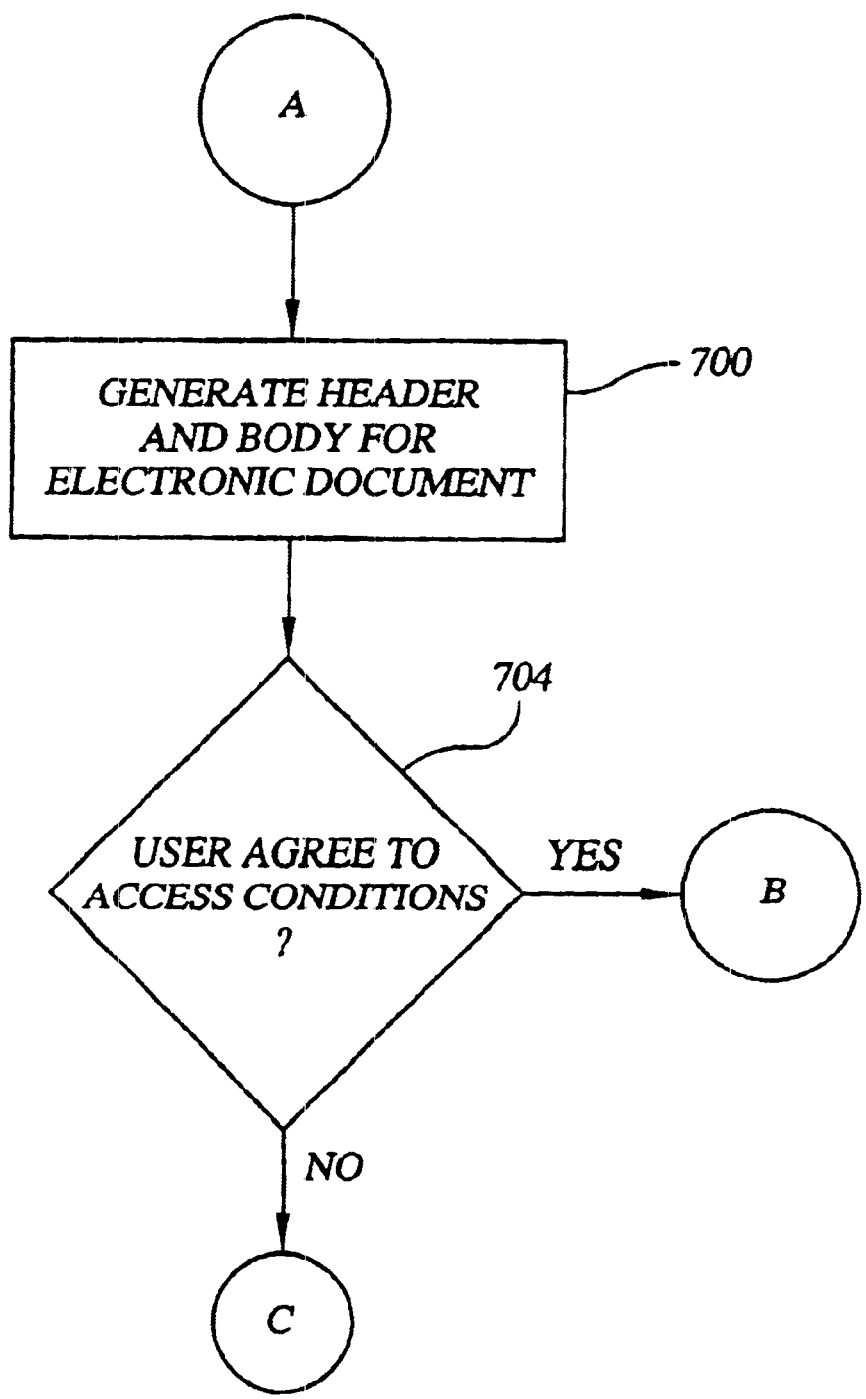

It is noted that in one embodiment of the invention, one or more of the states shown in FIGS. 6 and 7 can occur in a pre-processing stage prior to receiving requests for the electronic resource from the client computer 115 or one of the IR systems 208A–208M. For example, data object conversion (state 512), index information partitioning (state 520), index information obfuscation (state 528), generation of electronic documents (states 532 and 700) can occur, if desired, prior to receiving a request for one of the data objects 216A–216N.

Figure 10:
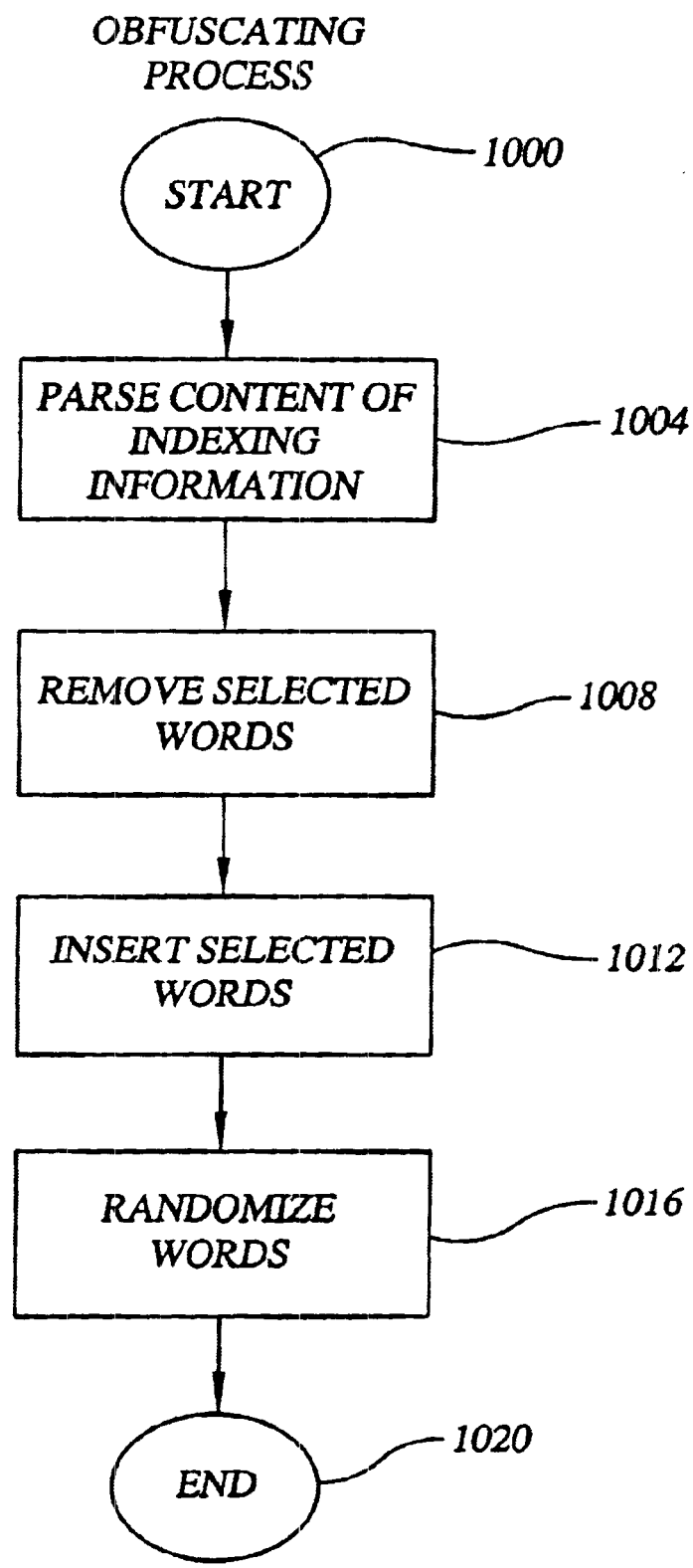
FIG. 10 is a flowchart illustrating an obfuscation process that is performed by the server computer of FIG. 2 with respect to index information that is associated with one of the data objects of FIG. 2.

FIG. 10 is a high level flowchart illustrating a process of obfuscating index information. FIG. 10 illustrates in further detail the state 528 of FIG. 6. In one embodiment of the invention, prior to traversing the states of FIG. 10, the server computer 110 has received a request for an electronic resource at a selected URL. Furthermore, the server computer 110 has identified a source data object that is associated with the selected URL, and the server computer 110 has prepared a putative set of index information for the source data object. The putative set of index information may have come from one of the data objects 216A–216N, an indexing file that is associated with the source data object, or some other source. The obfuscating process transforms the index information in such a way as to obscure or confuse the meaning of the information without interfering with the ability of an IR system to properly index and retrieve the electronic document.

After starting at a state 1000, the server computer 110 (FIG. 1) proceeds to a state 1004 wherein the server computer 110 parses the content of the index information. At the state 1004, the server computer 110 "tokenizes" via a tokenizer each of the words in the index information. Tokenizing refers to separating the index information into groups of words, "tokens," based upon a delimiter which depends upon the indexing characteristics of the requesting IR system. The delimiter can include white space, e.g., a space, a carriage return, or a tab, or, alternatively, can be a word from the stop list 268 (FIG. 2). If the requesting IR system recognizes phrases (as indicated by the information retrieval database 224), the server computer 110 parses the index information based upon the words in the stop list 268, thereby creating a plurality of tokens, each of the tokens having one or more words. Otherwise, if the requesting IR system does not recognize phrases, the server computer 110 parses the index information based upon white space that is within the index information.

Continuing to a state 1008, the server computer 110 removes selected tokens from the index information. In one embodiment of the invention, the server computer 110 removes from the index information each of the tokens that are listed within the stop list 268.

For example, FIG. 13 illustrates an exemplary data object 1300, wherein the data object comprises an HTML document. Assuming that the contents of the exemplary data object 1300 comprised the putative set of index information, after completing the state 1008, as is shown in FIG. 13, the server computer 110 has removed one or more of the tokens that are listed within the stop list 268. FIG. 14 illustrates an exemplary set of tokens that remain after the server computer 110 has removed selected tokens from the exemplary data shown in FIG. 13.

Moving to a state 1012 (FIG. 10), the server computer 1100 may optionally insert one or more selected tokens into the index information. In one embodiment of the invention, the server computer 110 replaces one or more of the tokens that were discarded in state 1008 with a randomly selected token from the stop list 268. The server computer 110 may optionally elect to insert random tokens from the stop list 268 even though no words were discarded from step 1008.

Continuing the example from above, FIG. 15 illustrates the contents of the index information shown in FIG. 14 after selected tokens have been added to the index information.

Next, at a state 1016, the server computer 110 optionally randomizes via a randomizer the order of each of adjacent tokens. The tokens are randomized by selecting a predetermined number of tokens from the output of the previous steps (in the order they were parsed), and then randomizing the order of those tokens. The number of tokens that is gathered in each pass is known as the randomness factor. The greater the value of the randomness, the greater is the impact on IR systems that evaluate the proximity of words. If the server computer 110 uses a stop list 268 that has a large number of tokens, the index information may be adequately obfuscated by the removal of the words that are in the stop list 268 and the randomization step may be omitted.

Still referring to the state 1016, in another embodiment of the invention, the order of the tokens is reversed via a token order reverser. If the order of the tokens is reversed, the index information will be slightly more obfuscated that otherwise; however this reversal may reduce the recall and precision of IR systems that consider word order. FIG. 16 illustrates the contents of the index information after the contents of the index information shown in FIG. 15 has been randomized. Next, at a state 1020, the obfuscation process ends.

Figure 11:
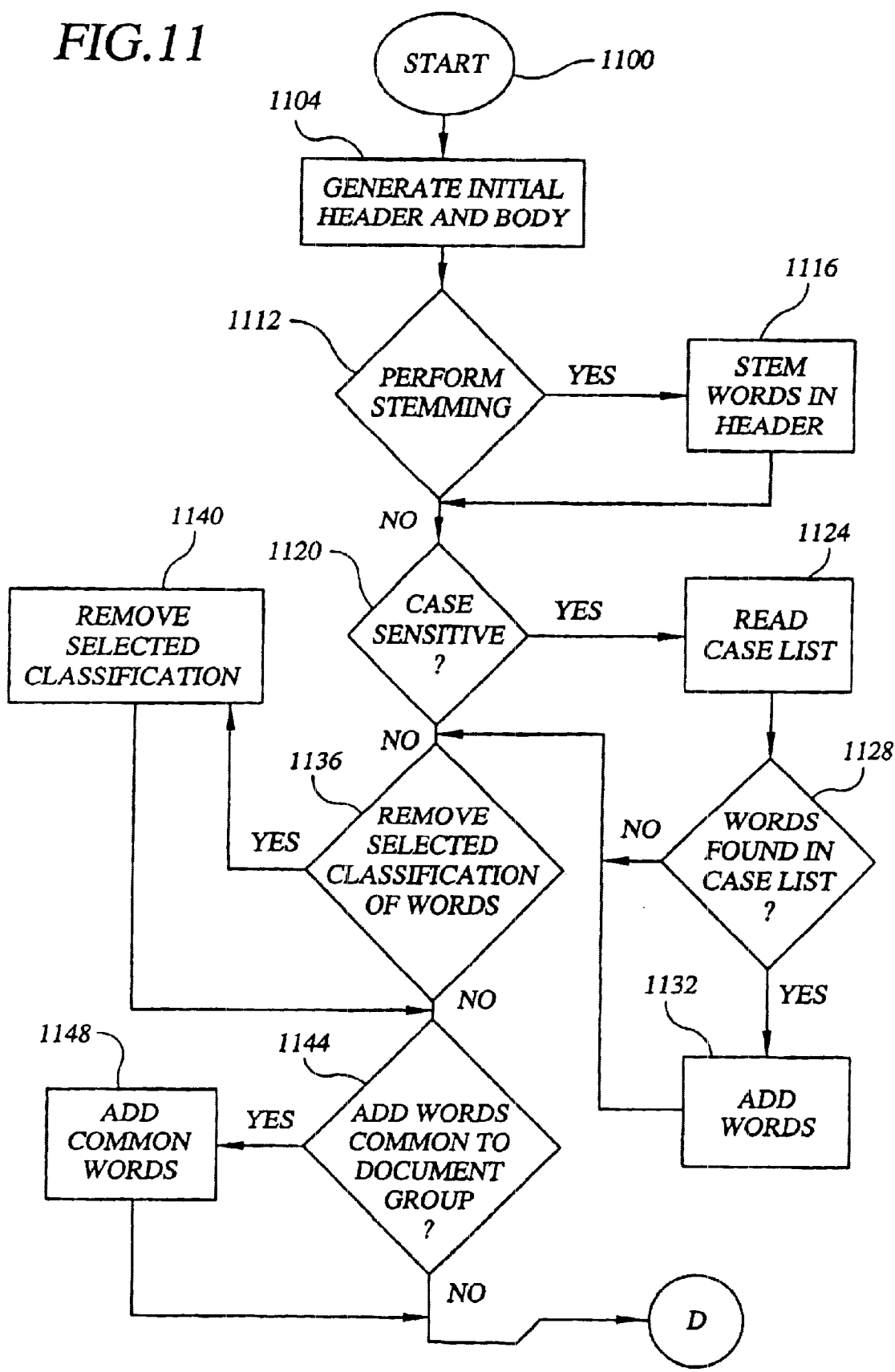
FIGS. 11 and 12 are collectively a flowchart illustrating in further detail a process for dynamically preparing the index information for an electronic document in response to a request for a network resource.
Figure 12:
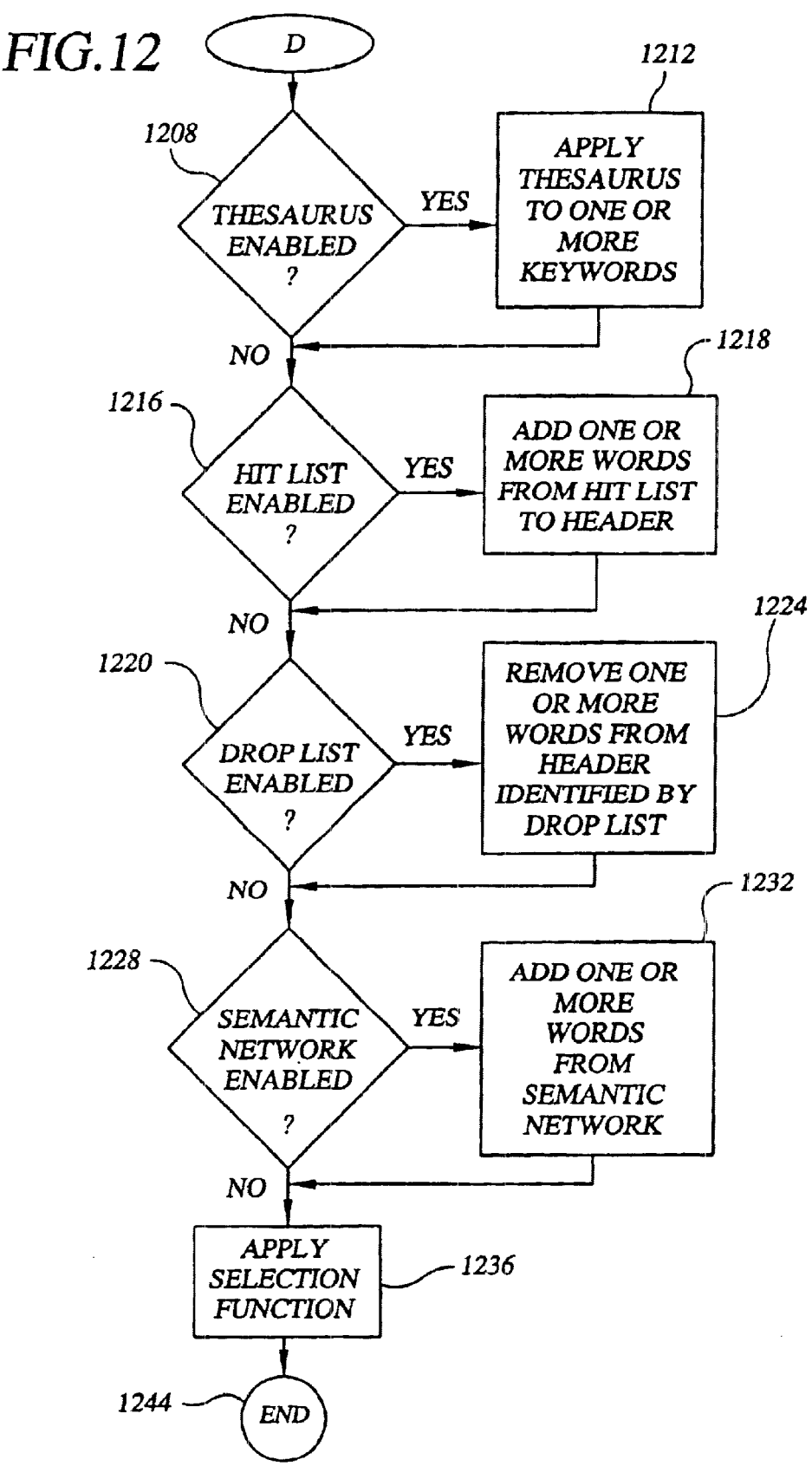

FIGS. 11 and 12 are collectively a flowchart illustrating a process of dynamically customizing the index information for the source data object. FIGS. 11 and 12 further illustrate the states that are within state 532 of FIG. 6. In one embodiment, prior to entering the states shown in FIGS. 11 and 12, the server computer 110 has determined that it has received a request for an electronic resource at a selected URL from one of the IR systems 208A–208M. In another embodiment, the server computer 110 is preprocessing a selected data object and, is customizing the index information in preparation of a future request. Furthermore, the server computer 110 has prepared a putative set of index information that may optionally be obfuscated by the process shown in FIG. 10.

After starting at a start state 1100, the server computer 110 (FIG. 1) proceeds Ad to a state 1104. At the state 1104, the server computer 110 (FIG. 1) dynamically generates an initial header and body for the requested electronic document based upon the contents of the putative set of index information. In one embodiment of the invention, the header and the body of the electronic document comprises each of the words in the putative set of index information. For example, assuming the electronic document is an HaFML document, the server computer 110 can insert each of the words in the putative set of index information into the keywords section of the header. The server computer 110 inserts the command <META Name="keywords" Content="Key Word List">, wherein Key Word List is a list of each of the words, into the header portion of the electronic document. Furthermore, the server computer 110 can optionally insert one or more words in the "description" section of the header. In HTML, the description metatag allows IR systems to display an intelligible excerpt regarding the content of the document beneath the title of the electronic document. The server computer 110 may optionally insert one or more words from the putative set of index information and/or a description that is associated with the data object in the body of the electronic document. Optionally, depending on the indexing characteristics of the requesting IR System, if index information is to be included in the body of the electronic document, the server computer 110 can set the font of the text within the body portion to be displayed using a white font on and white background to provide a more user-friendly display to the electronic document. However, if the requesting IR system ignores text having a font color that is the same as the background, the server computer 110 does not employ this technique.

Moving to a decision state 1112, the server computer 110 determines whether to perform "stemming" with respect to the index information. Stemming refers to the process of truncating one or more of the words comprise the index informnation. In one embodiment of the invention, the determination of whether to perform stemming is based upon the indexing characteristics of the requesting IR system. It is noted that for some electronic document formats, the header portion of the electronic documents can only store a selected amount of characters. Furthermore, some IR systems only analyze a selected portion of the header, e.g., the first 100 characters in the index information portion of the header. For these electronic document formats and IR systems, the server computer 110 advantageously attempts to maximize the number of index words that are included within the header. By stemming one or more of the index words that are within the header, the server computer 110 reduces the total character count of the index words, thereby leaving space for one or more index words to be added to the header of the electronic document.

If the server computer 110 (FIG. 1) determines to perform stemming, the server computer 110 proceeds to a state 1116. At the state 1116, the server computer 110 stems the words in the index information. In one embodiment of the invention, the server computer 110 substitutes one or more words from the index information with a corresponding word from the stem list 238. In another embodiment of the invention, the server computer 110 removes selected prefixes and/or suffixes from the index words to create the stemmed words.

Referring again to the decision state 1112, if the server computer 110 (FIG. 1) determines not to perform stemming, or, alternatively, from the state 1116, the server computer 110 proceeds to a decision state 1120. At the state 1120, the server computer 110 determines whether to insert one or more words into the header and/or body of the electronic document using words from the case list 264. In one embodiment of the invention, the determination whether to insert one or more words from the case list 264 is based upon the indexing characteristics of the requesting IR system.

If the server computer 110 determines to add or more words from the case list 264, the server computer 110 proceeds to a state 1124. At the state 1124, the server computer 110 reads the case list 264. Continuing to a decision state 1128, the server computer 110 determines whether one or more words in the case list 264 are also included within the electronic document. If the server computer 110 identifies one or more words in the case list 264 that are also in the electronic document, the server computer 110 proceeds to a state 1132. At the state 1132, the server inserts one or more words from the case list 264 into the electronic document.

If at the decision state 1120 the server computer 110 determines not to add or more words from the case list 264, or, if at the decision state 1128 no words were identified in the electronic document that were in the case list 264, or after completing the state 1132, the server computer 110 proceeds to a decision state 1136.

At the decision state 1136, the server computer 110 determines whether to remove a selected classification of words. The selected classification can include duplicative words, adjectives, adverbs, nouns, pronouns, or verbs. In one embodiment of the invention, the determination whether to remove a selected classification of words is based upon the indexing characteristics of the requesting IR system. In another embodiment of the invention, the determination whether to remove a selected classification of words is based upon the preference of the provider of the source data object. It is noted that more than one classification of words may be removed.

For example, if the requesting IR system does not place additional weight on index words that are duplicative, the server computer 110 can decide to remove the duplicative word to make space in the index information for other non duplicative words. Furthermore, for example, the server computer 110 can remove adjectives from the index information to increase the obfuscation of the index information and to also increase space in the index information for other potentially more meaningful index information.

If the server computer 110 determines to remove a selected classification of words, the server computer 110 proceeds to a state 1140. At the state 1140, the server computer 110 removes the selected classification of words from the index information.

Referring again to the decision state 1136, if the server computer 110 (FIG. 1) determines not to remove a classification of words, or, alternatively, after completing the state 1140, the server computer 110 proceeds to a decision state 1144. At the decision state 1144, the server computer 110 determines whether to add one or more words to the electronic document that are common to a group of documents. The server computer 110 may determine that even though a word was not one of the words of the source data object (and therefor not one of current index words in the electronic document), the word should be added since it is found in one or more data objects that are related to the source data object. If the server computer 110 determines to add one or more of the common words, the server computer 110 proceeds to a state 1148. At the state 1148, the server computer 110 inserts one or more of the common words into the electronic document.

Referring again to the decision state 1144, if the server computer 110 (FIG. 1) determines not to add common words to the electronic document, or alternatively, after completing the state 1148, the server computer 110 proceeds to a state 1208 (FIG. 12) via off page connector "D." At the state 1208, the server computer 110 determines whether to add one or more words from the thesaurus module 232 (FIG. 3).

If the server computer 110 determines to add or more words from the thesaurus 232, the server computer 110 proceeds to a state 1212. At the state 1212 the server computer 110 identifies one or more words from the thesaurus 232 that have a similar meaning to one or more of the index words into the electronic document. In one embodiment of the invention, the server computer 110 checks the thesaurus module 232 for each of the words that are within the electronic document. In another embodiment of the invention, the server computer 110 only checks the thesaurus module 232 for words that are found multiple times within the index information. In yet another embodiment of the invention, the server computer 110 only checks the thesaurus module 232 for the words that were added in the state 1148. In yet another embodiment of the invention, the server computer 110 checks the thesaurus module 232 for those words that were removed at the state 1140. After identifing one or more related words via the thesaurus module 232, the server 110 inserts the identified words into the electronic document.

If the server computer 110 (FIG. 1) determines not to add or more words from the thesaurus module 232, or alternatively, after completing the state 1212, the server computer 110 proceeds to a decision state 1216. At the decision state 1216, the server computer 110 determines whether to add or more words from any hit lists, such as the hit list 250 (FIG. 3), that may be associated with the data object. The server computer 110 can determine whether to apply a hit list on a data object-by-data object basis, or alternatively, on a group-by-group of data objects basis.

If the server computer 110 determines to add one or more words from the hit list 250, the server computer 110 proceeds to a state 1218. At the state 1218, the server computer 110 adds one or more words from the hit list 250.

Referring again to the decision state 1216, if the server computer 110 determines not to add words from the hit, or alternatively, after completing the state 1218, the server computer 110 proceeds to a decision state 1220.

At the decision state 1220, the server computer 110 determines whether to remove one or more words from the index information that are identified by the drop list 260 (FIG. 3). If the server computer 110 determines to remove one or more words from the drop list 260, the server computer proceeds to a state 1224. At the state 1224, the server computer 110 removes one or more words from the index information that are found in the drop list.

Referring again to the decision state 1220, if the server computer 110 (FIG. 1) determines not to remove one or words from the drop list 260, or, alternatively, after completing the state 1224, the server proceeds to a decision state 1228. At the state 1228, the server computer 110 determines whether the semantic network module 220 (FIG. 3) is enabled. If the semantic network module 220 is enabled, the server 220 proceeds to a state 1232 and adds one or more words that have been identified by the semantic network to the index information.

Referring again to the decision state 1228, if the semantic network module 220 (FIG. 3) is not enabled, or, alternatively, after completing state 1232, the server computer 110 (FIG. 1) proceeds to a state 1236. At the decision state 1236, if the number of words in the index information is greater than the number of words that are used by the requesting IR system, the server computer 110 applies a selection function to remove one or more words from the index information. In one embodiment of the invention, the server computer 110 prioritizes and maintains in the index those words that occur with a high frequency in a high number of documents. It is noted that the selection function of state 1236 may optionally be applied after the server computer 110 executes after any of the states 1116, 1132, 1140, 1148, 1212, 1218, or 1224. Continuing to an end state 1244, the server computer 110 proceeds to an end state 1248.

The present system provides a cost effective solution to providing index information to IR systems. The system does not require any changes on the part of the IR system providers. DRM-protected data objects can be used with the IR systems as if the DRM-protected data objects are not rights-protected at all. The system permits seamless, nearly transparent, and immediate support for searching of DRM-protected data objects, while allowing the DRM software to remain in exclusive control over the DRM data objects.

Furthermore, one embodiment of the present invention (FIG. 1) reduces the overhead that is associated with maintaining index information for various heterogeneous IR systems. The server computer 110 can generate customized index information on the fly based upon the indexing characteristics of the IR system. Furthermore, if the content of the data objects 216A–216N changes, the server computer 110 can automatically generate new index information for the data object.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of generating index information for a data object, the method comprising:
    generating index information for the data object, wherein the index information includes a set of one or more keywords;
    selecting one or more of the keywords from the index information;
    identifying one or more words that are associated with the selected keywords; and
    adding the identified words to the set of keywords, the identified words providing additional keywords for the index information for the data object.

2. The method of claim 1, wherein identifying the one or more words that are associated with the selected keywords comprises using a thesaurus to identify one or more words that are related to the selected keywords.

3. The method of claim 1, wherein identifying the one or more words that are associated with the selected keywords comprises using a semantic network to identify one or more words that are related to the selected keywords.

4. The method of claim 1, additionally comprising obfuscating at least a portion of the index information so that the intelligibility of the contents of the index information is reduced.

5. The method of claim 1, wherein the electronic document is dynamically generated in response to a request for the network resource that is maintained by a server computer.

6. A method of generating index information for a data object, the method comprising:
    generating index information for the data object; identifying one or more words that are common to a group of data objects that includes the data object; and
    adding the identified words to the index information.

7. The method of claim 6, additionally comprising obfuscating at least a portion of the index information so that the intelligibility of the contents of the index information is reduced.

8. The method of claim 6, wherein the index information is dynamically generated in response to a request for an electronic resource that is maintained by a server computer.

9. A method of generating index information for a data object, the method comprising:
    generating index information for the data object, wherein the index information includes a set of one or more keywords;
    identifying the roots of selected keywords;
    substituting the selected keywords with the roots.

10. The method of claim 9, additionally comprising obfuscating at least a portion of the index information so that the intelligibility of the contents of the index information is reduced.

11. The method of claim 9, wherein the roots are automatically inserted into the index information upon a request for an electronic resource which is maintained by a server computer.

12. A method of generating index information for a data object, the method comprising:

generating index information for the data object, wherein the index information includes a set of one or more keywords;

classifying one or more of the keywords into one or more classifications;

selecting at least one of the classifications; and removing one or more of the keywords that are members of a selected classification of the keywords.

13. The method of claim 12, wherein classifying the one or more keywords comprises identifying whether a respective keyword is an adjective.

14. A method of generating index information for a data object, the method comprising:

generating index information for a data object, wherein the index information comprises one or more keywords;

selecting one or more of the keywords;

identifying one or more keywords that are associated with the selected keywords with a semantic network; and adding the identified keywords to the index information.

* * * * *